United States Patent

[11] 3,595,101

[72] Inventor Jesse F. Cooper, Sr.
Tulsa, Okla.
[21] Appl. No. 840,937
[22] Filed July 11, 1969
[45] Patented July 27, 1971
[73] Assignee Gaso Pump and Burner Manufacturing Company
Tulsa, Okla.

[54] RECIPROCATING PUMP HAVING IMPROVED CRANKSHAFT BEARING ARRANGEMENT
6 Claims, 4 Drawing Figs.
[52] U.S. Cl. .................................................. 74/596,
123/195, 417/526
[51] Int. Cl. .................................................. F16c 9/03

[50] Field of Search.......................................... 74/596;
308/179; 103/169, 206, 205; 92/151, 261, 146;
417/362, 526; 123/195

[56] References Cited
UNITED STATES PATENTS
2,519,501 8/1950 Redman ...................... 103/169
2,954,918 10/1960 Mueller........................ 74/596 X Primary Examiner—William F. O'Dea
Assistant Examiner—F. D. Shoemaker
Attorney—Head & Johnson ABSTRACT: In a pump employing a crankshaft to reciprocally drive pistons within cylinders, the crankshaft is rotatably supported within the pump housing by a forward and an intermediate thrust bearing unit and a rearward straight bearing unit.

PATENTED JUL 27 1971

INVENTOR.
JESSE F. COOPER, JR

BY

*Head & Johnson*

ATTORNEYS

3,595,101

RECIPROCATING PUMP HAVING IMPROVED CRANKSHAFT BEARING ARRANGEMENT

CROSS REFERENCES TO RELATED APPLICATIONS

This disclosure is not related to any known Unites States or foreign patent application.

BACKGROUND OF THE INVENTION

This invention relates to a pump having pistons reciprocally received within cylinders and driven by a bearing supported crankshaft; more particularly this invention relates to a pump employing an improved crankshaft bearing arrangement.

Plunger pumps are well known and widely used in industry. As usually constructed industrial high-pressure reciprocating pumps include a housing having a plurality of longitudinally aligned pistons disposed in individual cylinders. Reciprocation of the pistons in the cylinders is accomplished by a crankshaft rotatably supported within the housing and having portions outwardly of the housing to which rotary motion is applied. The crankshaft is typically rotatably supported within the pump housing by means of a forward and a rearward thrust bearing. The respective thrust bearings create opposite acting thrust forces on the crankshaft thereby preventing axial movement thereof. Depending upon the length of the crankshaft, one or more intermediate bearings of the nonthrust type are sometimes employed.

High-pressure reciprocating pumps are typically driven by electric motors, internal combustion engines or turbine drives. The means most commonly used of coupling a motor or engine to a pump includes the use of a sheave secured to the pump crankshaft, a sheave secured to the motor or engine drive shaft, and one or more belts between the sheaves. This arrangement is not completely satisfactory since it means that the bearing on the pump crankshaft adjacent the sheave must sustain high lateral forces applied by tension of the belts in addition to the thrust load.

In the present arrangement of high-pressure industrial reciprocating pumps utilizing thrust bearings at each end of the crankshaft, as previously mentioned, the bearing adjacent the sheave must support both a thrust and a high lateral force. Bearings are most efficiently and effectively designed to withstand either an axial thrust or a side force, but not both.

It is therefore an object of this invention to provide a reciprocating pump which overcomes problems in the bearing arrangement of existing pumps.

A more specific object of this invention is to provide a reciprocating pump adaptable to be driven by a sheave affixed to an extending portion of the crankshaft, the sheave receiving rotary force applied by one or more belts, the pump having a bearing arrangement such that the bearing which must resist the side force imparted by the sheave is not required to resist axial thrust forces.

DETAILED DESCRIPTION OF THE DRAWINGS

Figure 1:
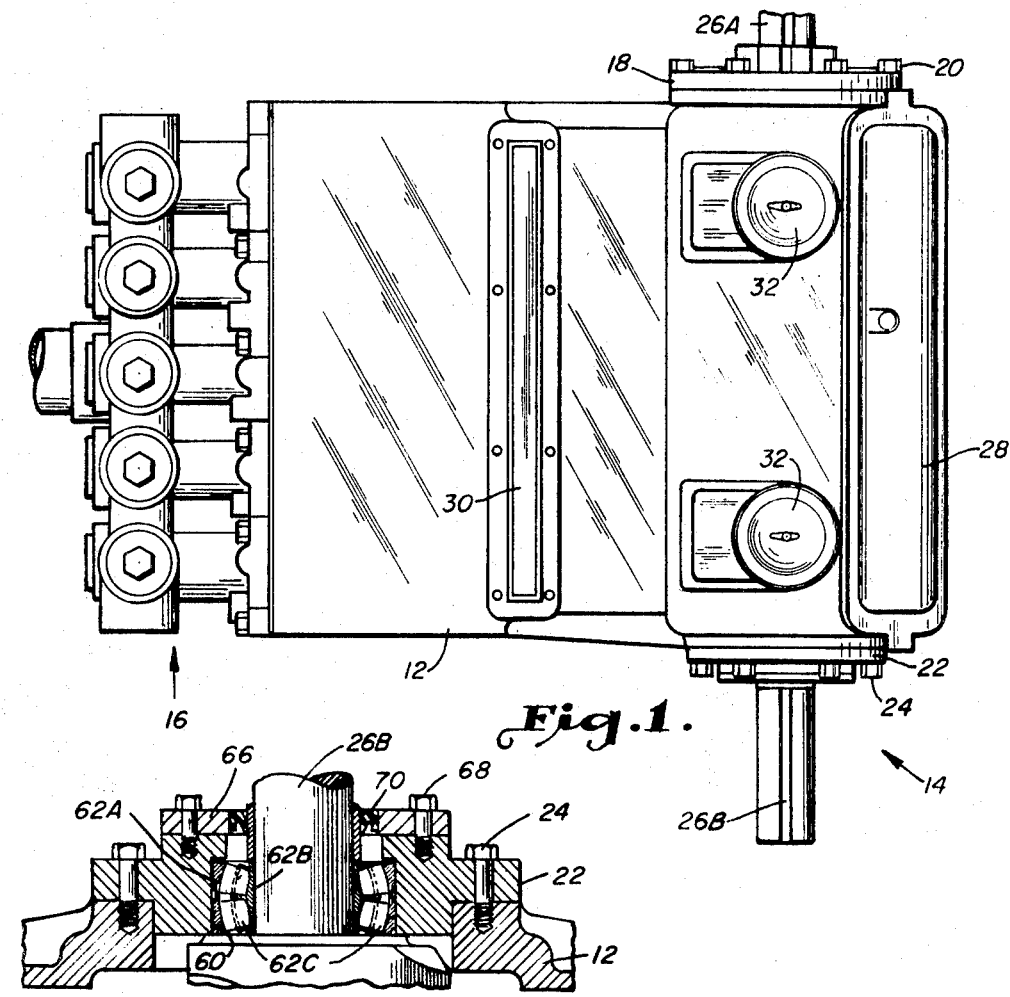
Figure 4:
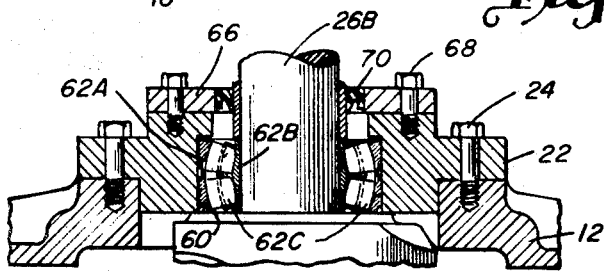
Figure 2:
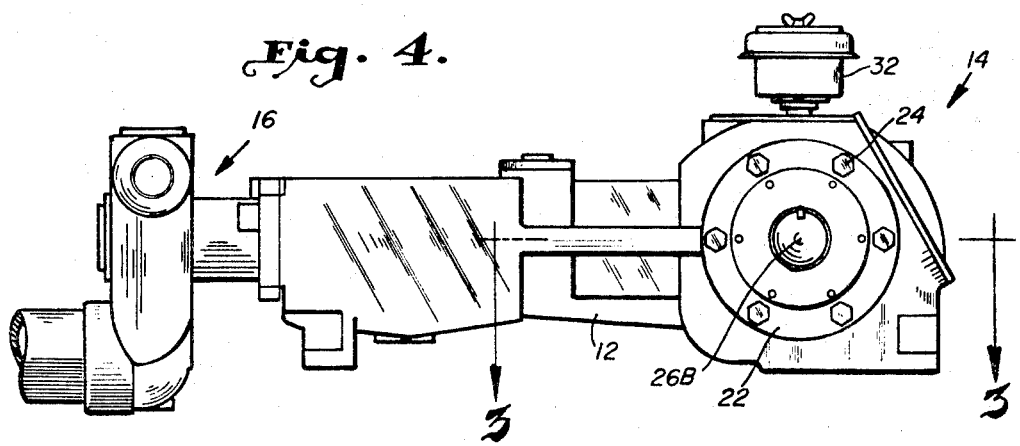
Figure 3:
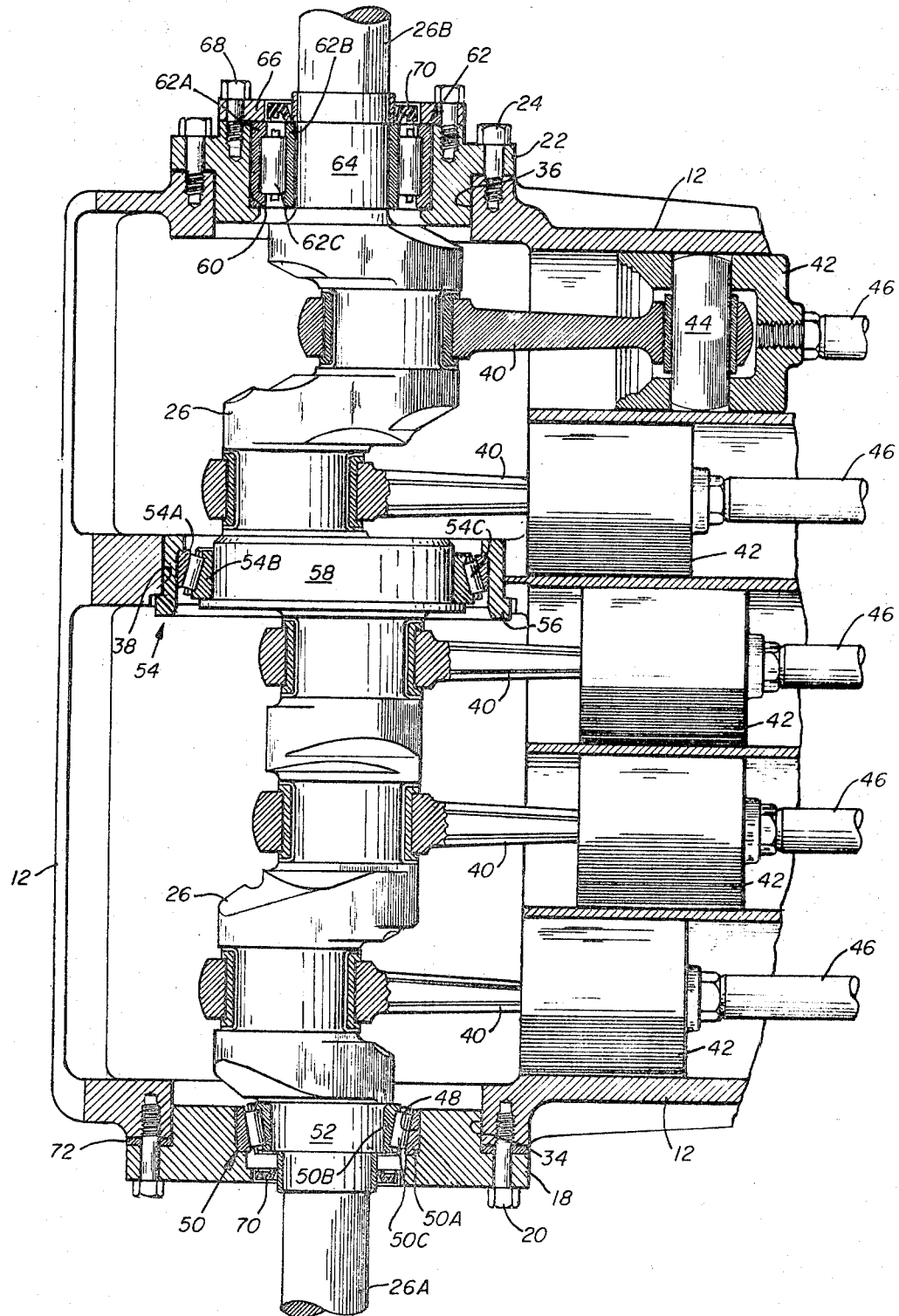

FIG. 1 is a top view of a pump incorporating the invention.
FIG. 2 is a side view of the pump of FIG. 1.
FIG. 3 is a cross-sectional view taken along the line 3-3 of FIG. 2.
FIG. 4 is a partial view of the cross section of the pump as shown in FIG. 3 but showing the use of a spherical roller bearing in place of the straight cylinder bearing of FIG. 3.

GENERAL DESCRIPTION OF THE INVENTION

Generally the invention relates to a pump having a plurality of pistons reciprocated by means of an externally driven crankshaft. The crankshaft has, as an integral part thereof, a forward, an intermediate and a rearward coaxial bearing surface and is rotatably supported within the pump housing by a forward thrust bearing, an intermediate thrust bearing and a rearward straight roller bearing received on the respective bearing surfaces of the crankshaft.

DETAILED DESCRIPTION

Referring now to the drawings and first to FIGS. 1 and 2, the external appearance of a pump incorporating the principles of this invention is shown. The pump has a frame 12, at one end of which, generally indicated by the numeral 14, is the power end, and at the opposite end, generally indicated by the numeral 16, is affixed the fluid end. The power end includes means of changing rotary motion to reciprocal motion for the reciprocal actuation of pistons within cylinders. The fluid end 16 includes the pistons, cylinders, intake and exhaust manifolds, intake and exhaust valves and so forth. The arrangement of the fluid end of the pump illustrated is typical of high-pressure industrial-type pumps; therefore this invention is concerned exclusively with the power end portion of the pump.

Supported to one side of frame 12 is a first bearing plate 18, held to the frame by means of bolts 20. At the opposite side of frame 12 is a second bearing plate 22 held by means of bolts 24. Rotatably supported within the frame 12 is a crankshaft having end portions 26A and 26B extending therefrom. Frame 12 includes access covers 28 and 30 and breather filters 32 which are typical of pumps of this arrangement.

The general appearance of the pump of FIGS. 1 and 2 is not substantially unlike that of typical high-pressure industrial pumps well known in the industry. The details of the bearing arrangement by which the crankshaft is supported and, which constitutes the novel feature of this invention, is best understood by referring to FIG. 3. Frame 12 includes a first opening 34 at one side of the frame and opposed thereto, a second axially aligned opening 36. Between openings 34 and 36 there is provided in the frame an intermediate bearing opening 38 in axial alignment with openings 34 and 36. Supported in opening 34 is the first bearing plate 18 previously mentioned. In like arrangement, supported in second opening 36 is the second bearing plate 22.

The embodiment of the invention illustrated is a quintuplex pump, that is, one having five cylinders. Received on the crankshaft 26 are five connecting rods 40, the inner end of the connecting rods being rotatably received about the crankshaft. The outer ends of each of the connecting rods 40 connected to a crosshead member 42; the outer end of the connecting rods 40 being connected to the crossheads 42 by means of pins 44, only one of which is shown. From crossheads 42 piston rods 46 extend to connect to pistons (not shown) which are reciprocated in the cylinders in the fluid end of the pump as the crankshaft 26 rotates, the pistons, fluid end and so forth not being shown in detail since such forms no part of the invention.

While the invention discloses the arrangement for a quintuplex pump, it is understood that it is applicable to pumps having a greater or a fewer number of cylinders.

First bearing plate 18 includes an axial opening 48 therein which receives a forward thrust bearing, generally indicated by the numeral 50. While bearing 50 may be of varying arrangements it typically includes: an outer race 50A received in opening 48; an inner race 50B which is received on a forward thrust bearing journaled surface 52 on crankshaft 26; and a plurality of tapered thrust bearing rollers 50C. Thus the forward thrust bearing 50 rotatably supports one end of the crankshaft 26 adjacent the extending portion 26A and at the same time is adapted to exert thrust on the crankshaft in the direction towards the second bearing plate 22.

Received in intermediate opening 38 within the frame 12 is an intermediate thrust bearing generally indicated by the numeral 54. The intermediate thrust bearing 54 is shown retained within a tubular bearing retainer 56, the exterior circumference of which is pressed into opening 38. The intermediate thrust bearing 54 includes: an outer race 54A which is nonrotatably received in the bearing retainer 56; an inner race 54B which is received on intermediate bearing journaled surface 58 formed as a part of the crankshaft 26; and a plurality of thrust rollers 54C. Bearing 54 is arranged to impart thrust against the crankshaft 26 in a direction towards the forward bearing 50. Thus, bearings 50 and 54 impart thrust on the crankshaft 26 in directions opposite each other to thereby rotatably support crankshaft 26 but prevent the axial displacement thereof.

Second bearing plate 22 includes an opening 60 in which a straight cylinder bearing, generally indicated by the numeral 62, is received. Bearing 62 includes: an outer race 62A received in opening 60; an inner race 62B received on rearward journaled bearing surface 64 formed as part of crankshaft 26; and cylindrical rollers 62C between the inner and outer race of 62A and 62B. Straight cylinder bearing 62 is of the type which rotatably supports crankshaft 26 at the end thereof adjacent the extending portion 26B without imparting thrust in either direction.

A grease seal retainer 66, held in place by bolts 68, receives a seal 70 about the crankshaft. A seal 70 is also provided in first bearing plate 18.

It can be seen that the arrangement of the pump as shown in FIG. 3 is a basic departure from the typical pump design. In the arrangement of pumps presently known, thrust bearings are provided at each end of the crankshaft 26 with intermediate bearings being of the straight cylinder type. This known type of arrangement has a disadvantage, as previously indicated, in that the crankshaft extending end portion 26B which normally receives a sheave by which rotary motion is imparted to the crankshaft must then serve to resist the lateral force applied to the crankshaft by the sheave. In the arrangement of this invention, straight cylinder bearing 62 is immediately adjacent the extending crankshaft portion 26B which receives a sheaves (not shown). Such sheaves in turn receive belts which extends to a sheave attached to a prime mover. The belts cause a substantial side force on the crankshaft in the process of applying rotary motion to the crankshaft. In the arrangement of this invention, this side force is received on the straight cylinder bearing 62. The primary function of bearing 62 is to resist this side force and bearing 62 is not required to impart thrust, that is, it is not required to resist axial displacement of the crankshaft 26.

Instead, the axial displacement of the shaft 26 is controlled by the opposed forward thrust bearing 50 and intermediate thrust bearing 54. Thrust bearings 50 and 54 retain the crankshaft 26 in its axial position, as do the thrust bearings utilized in all reciprocal pump applications, but neither of the thrust bearings is required to withstand the side force imparted to the crankshaft by sheaves affixed thereto. In addition, the arrangement of this invention achieves reduced deflection of the crankshaft.

Straight cylinder bearing 62 may be replaced by a spherical roller bearing arrangement as shown in FIG. 4 in which the same elements have the same numbers. The spherical roller bearing of FIG. 4 provides the same function as the straight cylinder bearing of FIG. 3, that is, both are lateral load resisting nonthrust bearings. The expression "straight roller bearing" as used herein includes straight cylinder bearings, spherical roller bearings, ball bearings or any other type of nonthrust bearing which resists side force.

It is noted that the opening 34 in the frame 12 which receives first bearing plate 18 is of fairly large diameter. This affords easy assembly of the pump since opening 34 is of a diameter sufficient to receive intermediate bearing 54 during assembly or disassembly of the pump.

As a means of controlling the thrust applied against crankshaft 26 spacer 72 positioned between bearing plate 18 and frame 12 can be varied in thickness so that the crankshaft is held under the desired thrust, preventing its axial displacement.

While the invention has been described with a certain degree of particularity, it is manifest that many changes may be made in the details of construction and the arrangement of components without departing from the spirit and scope of this disclosure.

What I claim:

1. A pump having an improved bearing arrangement comprising:
   a housing having cylinders and a piston reciprocable in said cylinders;
   a crankshaft rotatably supported in said housing, the crankshaft having a forward, a rearward and an intermediate bearing journal surface thereon and crank arms between the bearing journal surfaces, said pistons including connecting rod portions extending to said crank arms;
   a forward thrust bearing supported by said housing and received on said crankshaft forward bearing journal surface, said forward thrust bearing exerting a thrust force on said crankshaft in the direction towards said rearward end thereof;
   an intermediate thrust bearing supported by said housing and received on said crankshaft intermediate bearing journal surface, said second thrust bearing exerting thrust force on said crankshaft in the direction towards said forward end thereof whereby said crankshaft is rotatably and nonaxially displaceably supported in said housing; and
   a rearward straight roller bearing supported by said housing in axial alignment with said forward and intermediate bearings and received on said crankshaft rearward journal surface.

2. A pump having an improved bearing arrangement as in claim 1 including means for adjusting said thrust force exerted on said crankshaft by said forward and intermediate thrust bearings.

3. A pump having an improved bearing arrangement as in claim 1 wherein said housing includes five cylinders, pistons and crank arms and wherein between said first thrust bearing and said intermediate thrust bearing there are three axially spaced crank arms, pistons and cylinders.

4. A pump having an improved bearing arrangement as in claim 1 wherein said crankshaft extends outwardly from said forward and rearward bearing journal surfaces externally of said housing.

5. A pump having an improved bearing arrangement as in claim 2 wherein said housing has a large diameter opening in the area of said forward bearing journal surface for passage therethrough of said journal bearing surfaces and has a flange for placement over said opening, said flange including fastening means for attachment to said housing.

6. A pump having an improved bearing arrangement as in claim 5 wherein said means for adjusting said thrust force comprises spacers insertable between said flange and said housing.